United States Patent [19]

Haines et al.

[11] Patent Number: 4,671,252

[45] Date of Patent: Jun. 9, 1987

[54] BUBBLE FORMATION AND CIRCULATION SYSTEM

[75] Inventors: Eldon L. Haines; Robert A. Block, both of Eugene, Oreg.

[73] Assignee: Sunrise Research, Inc., Eugene, Oreg.

[21] Appl. No.: 811,012

[22] Filed: Dec. 18, 1985

[51] Int. Cl.$^4$ ............................ F24J 3/02; F28D 13/00
[52] U.S. Cl. ...................... 126/433; 165/104.22; 237/59; 126/435; 126/432
[58] Field of Search ............... 126/433, 435, 432, 434, 126/446, 449; 165/104.24, 104.22; 237/59

[56] References Cited

U.S. PATENT DOCUMENTS

| 2,460,482 | 2/1949 | Abbot | 126/434 X |
| 4,270,521 | 6/1981 | Brekke | 126/433 |
| 4,478,211 | 10/1984 | Haines et al. | 126/433 |
| 4,505,262 | 3/1985 | Eaton | 126/434 X |

Primary Examiner—Larry Jones
Attorney, Agent, or Firm—James D. Givnan, Jr.

[57] ABSTRACT

Conduits jointly define a fluid and vapor occupied annular chamber which when the conduits are heated emits bubbles which propel a quantity of fluid along a conduit. A fluid imbalanced condition in fluid heads is achieved by the bubble propulsion of fluid to cause fluid circulation in a heating system exposed to a heat source. A heat exchanger is also disclosed.

4 Claims, 3 Drawing Figures

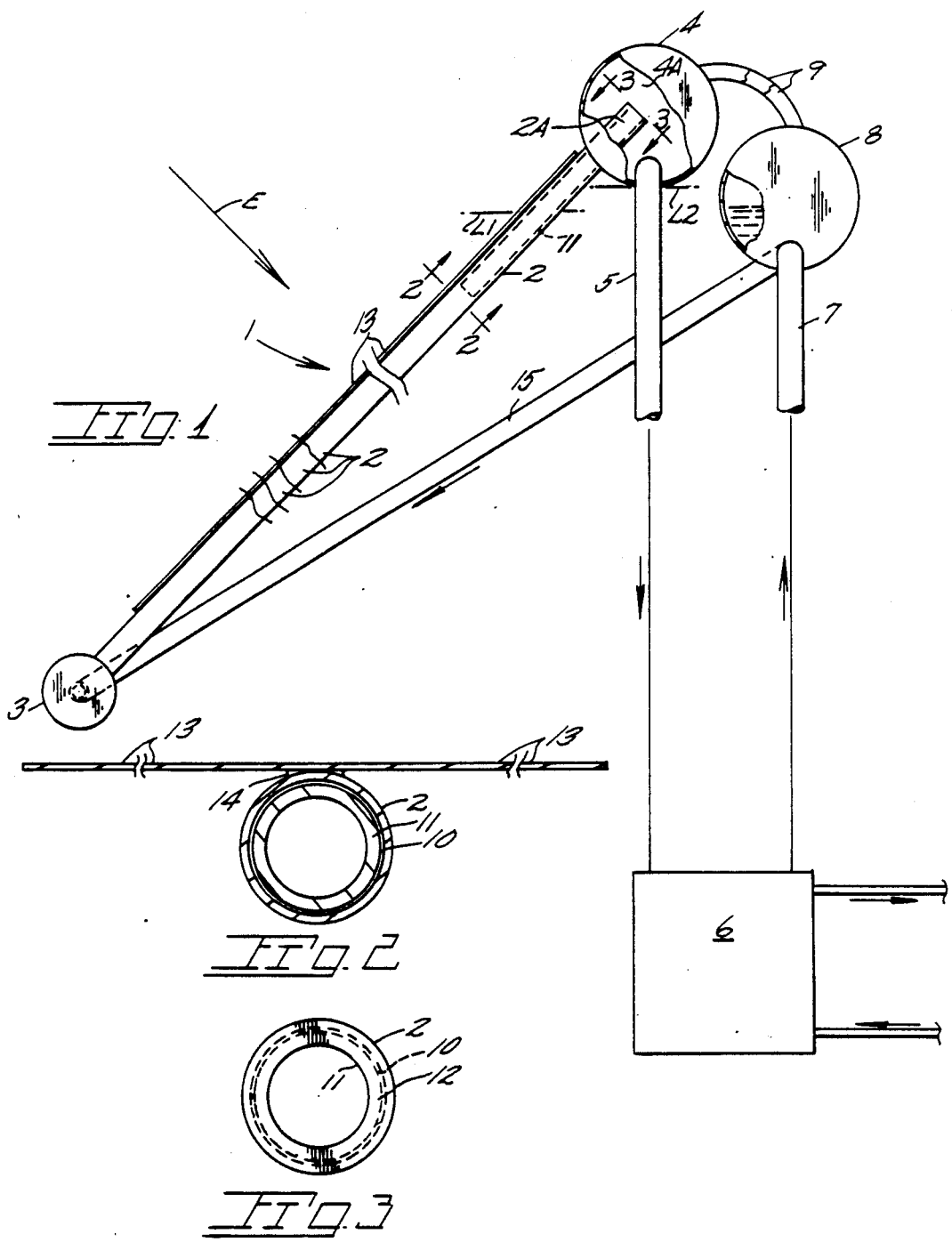

BUBBLE FORMATION AND CIRCULATION SYSTEM

BACKGROUND OF THE INVENTION

The present invention pertains generally to a fluid circulation system for the pumping of fluids in a heating system by bubble action. The advantages of solar heating systems relying on the imbalance of fluid heads for circulation are essentially twofold, the avoidance of costly fluid conduit systems with major components located by necessity at an elevated location in a building above a solar collector. Solar heating systems utilizing bubble propelled fluids are disclosed for example in U.S. Pat. Nos. 4,237,866; 4,478,211; 4,340,030 and Re. 31,032. While circulation of fluid by a bubble pumping action is, as noted above, very desirable a problem exists in providing and maintaining adequate bubble generation particularly in a closed system. Over a period of time bubble nucleation sites in a fluid vessel tend to diminish to hinder bubble generation and hence fluid circulation. A discussion of bubble nucleation per se is set forth in U.S. Pat. No. 3,696,861.

SUMMARY OF THE PRESENT INVENTION

The present invention is embodied within a conduit structure providing bubble formation and fluid lift means particularly suited for the circulation of fluid in a heating system.

Efforts to develop a reliable bubble circulation system have resulted in the realization that over a period of time bubble nucleation sites tend to diminish for one reason or another. Experimentation by the present inventors has shown that the continuous formation of bubbles may be achieved in a chamber defined by conduit means in a heating system exposed to solar radiation. To accomplish desired bubble nucleation, it has been found desirable to confine the fluid within a chamber defined by adjacent conduit walls. Steam vapor is released from the chamber followed by passage of an expanding bubble upwardly within the conduit means to lift a quantity or slug of fluid. Apparently slight cooling of the conduit walls during passage of the fluid causes recharging of the conduit defined chamber to restart the cycle. Capillary action may also be utilized to contribute to recharging of the chamber.

The conduit means may be embodied in inner and outer conduits with the chamber extending partially lengthwise thereof. A fluid source such as at an inlet manifold serves the lowermost conduit end while the opposite or discharge end discharges fluid slugs above a head of fluid to cause an imbalance between said head and the lesser head within said conduit means to cause fluid circulation.

The conduits at the present bubble formation and lift means have performed satisfactorily when of circular section.

Important objectives include the provision of a fluid circulation system for heating systems which utilizes a bubble flow to propel slugs of fluid and which system retains an adequate bubble nucleation source; the provision of a system which utilizes inner and outer conduits to form a chamber within which fluid may be heated to the extent a suitable train of bubbles is discharged for fluid transfer purposes.

BRIEF DESCRIPTION OF THE DRAWINGS

In the accompanying drawings:

FIG. 1 is a side elevational schematic view of a solar collector and heating system components with which the present invention may be utilized;

FIG. 2 is a vertical sectional view taken along line 2—2 of FIG. 1; and

FIG. 3 is an end elevational view of conduit means taken along line 3—3 of FIG. 1.

DETAILED DESCRIPTION OF THE PREFERRED EMBODIMENTS

With continuing attention to the drawings wherein applied reference numerals indicate parts similarly hereinafter identified, the applied reference numeral 1 indicates generally a structure for exposure to a heat source such as solar radiation at E. Details of a housing and supporting means for structure 1 are dispensed with as same are not believed pertinent to an understanding of the present invention which is applicable to a wide range of heating systems.

When structure 1 is adapted for the absorption of radiant energy, the structure comprises a series of conduit means or riser tubes 2 orientated for optimum absorption. A fluid supply manifold or header 3 is in communication with the lower ends of the several riser tubes 2. The uppermost end segments at 2A of the inclined conduits terminate in communication with the interior at 4A of a collection header 4.

The heated fluid received in header 4, as later explained, is directed via tubing at 5 toward the structure to be heated such, as for example, a fluid-to-fluid heat exchanger at 6 and thence redirected via tubing at 7 toward vapor condenser means at 8. Condenser means 8 functions to condense vapors discharged from the riser tubes 2 with the vapor condenser arrangement shown having one or more passageways 9 communicating header 4 with the condenser means It is understood that while the foregoing heating system corresponds generally to that disclosed in U.S. Pat. No. 4,478,211, various other heating systems may advantageously utilize the present invention which is particularly suited to providing fluid circulation through a system wherein multiple fluid heads exist resulting in a fluid imbalanced condition.

First conduit means or riser tubes 2 each have a portion which defines conjointly with second conduit means at 11, a vapor formation chamber 10. The second conduit means 11 is shown as being interiorly disposed within and of lesser section than conduit means 2 with chamber 10 defined by the closely spaced, opposed surfaces of conduit means 2 and 11. The conduit spacing maybe such as to promote fluid charging of the chamber by capillary action. At the upper or discharge end of conduit means 2, a closure at 12 blocks the upper end of vapor formation chamber 10. When the inclined conduits 2 and 11 are circular in section closure 12 will be of annular shape.

To enhance heat conduction to the conduit means 2 each may be provided with an energy collector plate 13 affixed as by brazing at 14.

In one suitable embodiment of the invention the tubes 2 have a three-eights inch outside diameter. Tube wall thickness is such as to be conducive to heat transfer and of requisite strength. The upper end segment of riser tube 2, partially defining chamber 10, may be two feet or so in length when in a solar panel sized for use in a home. Tube surface spacing maybe such to promote chamber filling by capillary action such as for example one sixteenth or one sixty fourth of an inch. The system is preferably evacuated to cause fluid or the fluid and its vapor to occupy chamber 10. The application of heat, such as from solar radiation, causes fluid in chamber 10 to vaporize as steam which is discharged from the lower end of the chamber to provide steam bubbles for passage into the lower end of second conduit means 11. The fluid trapped between successive bubbles in conduit means 11 is lifted past a fluid level at L1 and discharged in collection header 4 whereat it gravitates toward a fluid level at L2 to provide an imbalanced fluid system wherein gravity causes circulation of the heating system fluid.

The condenser means 8, as earlier noted, may be otherwise embodied, as for example, in a relatively cool fluid flow routed lengthwise along the collection header 4 and serving to condense steam discharged into the collection header. Accordingly, vapor pressure within collection header 4 is at all times, during system operation, at a lower value than the pressure exerted on a fluid slug by a steam bubble moving in conduit means 11.

The steam vapor discharged downwardly from chamber 10 is believed to be discharged in small increments each of which serves as a nucleation source for a vapor bubble. The bubble vapor is ultimately condensed in condenser means 8 for return to lower header 3 while assuring a pressure in header 4 conducive to bubble formation.

Retention of conduit means 11 against axial displacement in conduit means 2 may be by random points of contact between the conduit means.

The conduit means may be of horizontal, vertical or inclined disposition for optimum heating by a heat source.

Suitable fluids for use in the foregoing system may be a mixture of water and methanol or water and glycol.

While we have shown but one embodiment of the invention, it will be apparent to those skilled in the art that the invention may be embodied still otherwise without departing from the spirit and scope of the invention.

Having thus described the invention, what is claimed and desired to be secured in a Letters Patent is:

1. Bubble formation and fluid lift means in a heating system utilizing a fluid for exposure to a heat source and comprising in combination, first conduit means forming part of an energy absorbing structure and adapted at one end for communication with a fluid source, second conduit means in radially spaced relationship to said first conduit means and extending at least part way along the length of said first conduit means to define an elongate chamber therewith for vapor formation, said elongate chamber open at one end for vapor discharge to form bubbles, a closure closing the remaining end of said chamber, and said chamber adapted for partial occupation by fluid whereupon heating of fluid in said chamber by the heat source will cause vaporization to the extent vapor is ejected from said chamber for the bubble propulsion of fluid along said second conduit means to a fluid discharge point, header means located at said fluid discharge point, said header means forming a conduit into which the bubble propelled fluid is discharged.

2. The bubble formation and fluid lift means claimed in claim 1 wherein said first conduit means includes an energy collector plate for heating by the heat source.

3. The bubble formation and fluid lift means claimed in claim 2 wherein said first and second conduit means are concentric.

4. The bubble formation and fluid lift means claimed in claim 3 wherein said first and second conduit means are of substantially circular section and define a chamber of annular section.

* * * * *